(12) United States Patent
Foo et al.

(10) Patent No.: US 10,874,975 B2
(45) Date of Patent: Dec. 29, 2020

(54) SORBENT COMPOSITION FOR AN ELECTROSTATIC PRECIPITATOR

(71) Applicant: S. A. Lhoist Recherche et Developpement, Ottignies-Louvain-la-Neuve (BE)

(72) Inventors: Rodney Foo, Rayleigh (GB); David Lyons, Fort Worth, TX (US); Ian Saratovsky, Highland Park, IL (US)

(73) Assignee: S. A. Lhoist Recherche et Developpement, Ottignies-Louvain-la-Neuve (BE)

( * ) Notice: Subject to any disclaimer, the term of this patent is extended or adjusted under 35 U.S.C. 154(b) by 203 days.

(21) Appl. No.: 16/032,152

(22) Filed: Jul. 11, 2018

(65) Prior Publication Data

US 2020/0016527 A1    Jan. 16, 2020

(51) Int. Cl.
*B01D 53/02* (2006.01)
*B01D 53/10* (2006.01)
*B03C 3/017* (2006.01)
*B01J 23/02* (2006.01)

(52) U.S. Cl.
CPC .............. *B01D 53/10* (2013.01); *B01J 23/02* (2013.01); *B03C 3/017* (2013.01); *B01D 2253/102* (2013.01); *B01D 2253/11* (2013.01); *B01D 2253/1124* (2013.01)

(58) Field of Classification Search
CPC ........ B01D 2251/402; B01D 2251/404; B01D 2251/604; B01D 2253/102; B01D 2253/11; B01D 2253/1124; B01D 2258/0283; B01D 53/10; B01D 53/508; B01D 53/83; B01J 23/02; B03C 3/013; B03C 3/017
See application file for complete search history.

(56) References Cited

U.S. PATENT DOCUMENTS

| 4,397,742 A * | 8/1983 | Minnick ............... B01D 53/501 106/705 |
| 4,439,351 A | 3/1984 | Sinha |
| 4,502,872 A | 3/1985 | Ivester et al. |
| 5,145,815 A * | 9/1992 | Zarchy ...................... C07C 7/13 502/38 |
| 6,126,910 A | 10/2000 | Wilhelm et al. |
| 6,797,035 B2 | 9/2004 | Baldrey et al. |
| 7,585,353 B2 | 9/2009 | Gambin et al. |
| 7,744,678 B2 | 6/2010 | Laudet et al. |

(Continued)

FOREIGN PATENT DOCUMENTS

| PL | 192995 B1 | 12/2006 |
| WO | 2015119880 A1 | 8/2015 |

OTHER PUBLICATIONS

Rodney Foo et al.; "ESP Compatible Calcium Sorbent for SO2 Capture at Great River Energy's Stanton Station", Paper 49; MEGA Symposium; Baltimore, Maryland; 16 pages; Aug. 16-19, 2016.

(Continued)

*Primary Examiner* — Christopher P Jones
(74) *Attorney, Agent, or Firm* — Whitaker Chalk Swindle & Schwartz PLLC; Charles Gunter (57) ABSTRACT

A powdery calcium-magnesium compound used as a sorbent composition in flue gas treatment, compatible with electrostatic precipitators. The calcium magnesium compound is doped with calcium nitrate or nitric acid to reduce the electrical resistivity of the particles, increasing their collection efficiency.

18 Claims, 1 Drawing Sheet

(56) References Cited

U.S. PATENT DOCUMENTS

| | | | |
|---|---|---|---|
| 8,048,217 B2 | 11/2011 | Gambin et al. | |
| 2009/0229462 A1 | 9/2009 | Laudet et al. | |
| 2014/0374655 A1* | 12/2014 | Mimna | B01J 20/08 252/193 |
| 2016/0297712 A1* | 10/2016 | Ruckert | C04B 38/02 |

OTHER PUBLICATIONS

Robert A. Mastropietro; "Impacts of Hydrated Lime Injection on Electrostatic Precipitator Performance", ASTM Symposium on Lime Utilization; 10 pages; Jun. 28, 2018; The Woodlands, Texas.
PCT/EP2018/068770, International Search Report, 2 pages.

* cited by examiner

SORBENT COMPOSITION FOR AN ELECTROSTATIC PRECIPITATOR

BACKGROUND OF THE INVENTION

1. Field of the Invention

The present invention relates to a calcium-magnesium compound and to a sorbent composition for use in flue gas streams equipped with an electrostatic precipitator, a method for obtaining such sorbent composition and a process of flue gas treatment using an electrostatic precipitator which comprises a step of injecting such a sorbent composition. In another aspect, the present invention is related to a flue gas treatment installation using the sorbent composition according to the invention.

2. Background of the Invention

Fuel combustion in industrial processes or energy production generates particulate matter is (e.g. fly ashes) and acid gases for which their release in the atmosphere has to be minimized. The removal of fly ash from flue gas streams can be performed by an electrostatic precipitator (ESP). Some examples of electrostatic precipitators are described in U.S. Pat. Nos. 4,502,872, 8,328,902 or 6,797,035. An electrostatic precipitator generally comprises a shell with a flue gas inlet and a flue gas outlet, the shell enclosing a plurality of collection electrodes, and discharge electrodes spaced from each other and a plurality of hoppers positioned under the collecting plates. A voltage is applied between the discharge electrodes and the collection electrodes such as to create an electrostatic field charging the particulate material in the flue gas to obtain charged particulate material. The charged particulate material is collected by the collecting electrodes. The electrostatic precipitator further comprises rappers which provide mechanical shocks or vibrations to the collecting electrodes to remove the collected particles from the collecting electrodes. The collected particles fall down into hoppers arranged at the bottom of the shell and which are periodically or continuously emptied. The collecting electrodes can be planar or in a form of tubular or honeycomb structure and the discharge electrodes, are generally under the form of a wire or a rod.

Generally, the flue gas treatment installations including electrostatic precipitators are provided with an air preheater, which may be included in a boiler and/or otherwise provided as an additional element of the flue gas installation. The air preheater comprises a heat exchanger transferring the heat from the flue gas stream produced by the boiler to heat the combustion air to the boiler to increase the thermal efficiency of the boiler. In some embodiments, the flue gas treatment comprises multiple electrostatic precipitators. Cold-side electrostatic precipitators are located downstream the air preheater, thereby operate at lower temperatures generally less than 200° C. (392° F.). Hot side electrostatic precipitators are located upstream the air preheater and operate at higher temperatures, generally more than 250° C. (482° F.).

Sometimes for existing plants, the electrostatic precipitator units already operate at the boundary of their design capability due to more stringent particulate matter emission limits that have been introduced over the years and/or changes to plant operating conditions such as fuel switching.

The equation of Deutsch-Anderson describes with some approximations the collection efficiency of an electrostatic precipitator as:

$$\eta = 1 - \exp\left(-\frac{V_{pm} A_c}{Q}\right)$$

Wherein $\eta$ is the fractional collection efficiency, $A_c$ is the area of the collection electrode, $V_{pm}$ is the particle migration velocity and Q is the volumetric flow rate of gas. The properties of the particles that influence collection efficiency are primarily the particle size distribution and their resistivity. The resistivity of the particles influences the particle migration velocity as described previously in the Deutsch-Anderson equation.

Various attempts have been tried to reduce the resistivity of particles. It is known for example from U.S. Pat. No. 4,439,351 that for an electrostatic precipitator to work efficiently, the electrical resistivity of the fly ash must be within 1E7 ($1 \times 10^7$) to 2E10 ($2 \times 10^{10}$) ohms-cm. Another document, Mastropietro, R. A. Impact of Hydrated Lime Injection on Electrostatic Percipitator Performance in ASTM Symposium on Lime Utilization; 2012; pp 2-10, states that the resistivity of fly ash should be within 1E8 ($1 \times 10^8$) to 1E11 ($1 \times 10^{11}$) ohms-cm. However, the electrical resistivity of fly ash is generally higher and chemical additives were used such as $SO_3$, HCl, $NH_3$, $Na_2CO_3$, $Na_2SO_4$ and $NH(CH_2CH_2OH)$ to lower the resistivity of fly ash. However, those additives are susceptible to release of undesired compounds. The same document discloses the use of polymers for lowering the resistivity of fly ash. However, polymer additives generally degrade at high temperatures and must be injected to the flue gas stream at low temperatures.

Document U.S. Pat. No. 6,126,910 discloses the removal of acid gas from a flue gas with an electrostatic precipitator by spraying a solution of sodium bisulfite, calcium bisulfite, magnesium bisulfite potassium, bisulfite or ammonium bisulfite or a combination thereof into a stream of gas upstream to the electrostatic precipitator unit. Such bisulfite salts selectively remove the acidic gases such as HCl, HF and $SO_3$ but they don't remove sulfur dioxide. Sulfur dioxide in the flue gas has to be removed afterwards with a reagent such as hydrated lime. Document U.S. Pat. No. 6,803,025 discloses a similar process using a reaction compound selected from the group consisting of sodium carbonate, sodium bicarbonate, sodium hydroxide, ammonium hydroxide, potassium hydroxide, potassium hydroxide, potassium carbonate and potassium bicarbonate to remove acidic gases such as HCl, HF, $SO_3$ and partially $SO_2$ from the flue gas. However, remaining $SO_2$ still has to be removed by using another reagent such as hydrated lime. For the treatment of flue gas released by power plants, the amounts of chloride released by burning fuel or coal are generally very low relative to $SO_2$, therefore the flue gas treatment process can be simplified by using only hydrated lime as a sorbent.

The document WO2015/119880 relates to the drawbacks of trona or hydrated lime as sorbents for flue gas treatment process with electrostatic precipitator units. Sodium based sorbents are known to decrease the resistivity of particulate matter; however, a main drawback of the use of sodium sorbents is the leaching of heavy metals from the fly ash is enhanced leading to potential environmental contamination. Calcium hydroxide based sorbents do not present the problem of heavy metal leaching from fly ash, but they are known to increase resistivity of the particulate matter (fly ash) entrained in the flue gas stream so that the efficiency of the electrostatic precipitator unit may be lowered when calcium based sorbents are used. The same document discloses a composition for reducing particulate resistivity in a flue gas and for capturing acid gases, wherein the composition comprises an alkali metal/alkali earth particulate having a formula $(Li_{1-\alpha-\beta} Na_\alpha K_\beta)_w(Mg_{1-\delta} Ca_\delta)_x(OH)_y (CO_3)_z \cdot nH_2O$, more specifically a formula $Na_wCa_x(OH)_y (CO_3)_z \cdot nH_2O$ wherein a ratio of W to x is about 1/3 to about 3/1. Therefore the composition still presents a high amount of sodium which would be likely to not only leach itself, but sodium is also know to increase the leaching of heavy metals contained in the fly ash.

U.S. Pat. No. 6,797,035 discloses a process for reducing the resistivity of fly ash by spraying an aqueous solution of potassium nitrate or potassium nitrite on the stream of flue gas or by injecting powder of potassium nitrate or potassium nitrite into the duct through which the flue gas flows. A drawback of using those powders of nitrate or nitrite salts is that they react with other species than fly ash and results in less reactive chemical reaching the collection plates of the electrostatic precipitator. Therefore, it is suggested to inject those nitrate salts as finely divided powders to reduce the exposed reactive surface area and inhibit reactions with nitrous oxides and sulfur oxides.

U.S. Pat. No. 7,744,678 B2 discloses a method where addition of an alkali metal species, comprising sodium, between 0.2 and 3.5 wt %, to calcium hydroxide sorbents provides an improved reactivity towards $SO_2$ capture. Addition of the alkaline metal species is carried out in such a way that the BET specific surface area (SSA) by nitrogen adsorption remains high at $30 < SSA < 40$ ($m^2/g$).

The combination of sodium salts and hydrated lime beyond concentrations mentioned in U.S. Pat. No. 7,744,678 B2 is undesired because of two adverse effects: (1) increase of the sodium content will lead to increased leaching of heavy metals from the fly ash residue, (2) addition of sodium in aqueous form to hydrated lime reduces the BET specific surface area of the hydrated lime thus reducing the reactivity towards acidic gases.

In the paper #49 presented at the power plant pollutant control and carbon management "MEGA" symposium, Aug. 16-19, 2016, Baltimore, Md., Foo et al. present a successful industrial application of $SO_2$ removal with an enhanced hydrated lime sorbent used in a cold side electrostatic precipitator. Laboratory resistivity measurements of fly ash mixtures with hydrated lime and enhanced hydrated lime have been performed with $CaSO_4$, wherein $CaSO_4$ was added to simulate typical fly ash residues. Enhanced hydrated lime of this paper has a surface area greater than 40 $m^2/g$, a pore volume greater than 0.2 $cm^3/g$ and a median particle size $d_{50}$ comprised between 6 and 12 micrometers and has been found to present acceptable maximum resistivity of 1E11 ($1 \times 10^{11}$) Ohms·cm.

However, there is still a need to provide calcium-magnesium compound which can be advantageously used in flue gas treatment installations highly compatible with electrostatic precipitators.

The object of the present invention is to provide calcium-magnesium compound and sorbent composition comprising said calcium-magnesium compound removing the intrinsic drawback of these sorbents in their application in electrostatic precipitator units.

SUMMARY OF THE INVENTION

According to a first aspect, the present invention is related to powdery calcium-magnesium compound comprising at least a calcium-magnesium hydroxide content greater or equal to 80 weight %, with respect to the total weight of the powdery calcium-magnesium compound, further presenting a resistivity at 300° C. (372° F.) $R_{300}$ lower than 1E11 ($1 \times 10^{11}$) Ohms·cm and higher than 1E7 ($1 \times 10^7$) Ohms·cm, advantageously lower than 1E10 ($1 \times 10^{10}$) Ohms·cm and higher than 5E7 ($5 \times 10^7$) Ohms·cm, preferably lower than 5E9 ($5 \times 10^9$) Ohms·cm, more preferably lower than 1E9 ($1 \times 10^9$) Ohms·cm, even more preferably lower than 5E8 ($5 \times 10^8$) Ohms·cm.

It was surprisingly observed that a powdery calcium-magnesium compound can be successfully used in flue gas treatment using electrostatic precipitators when the resistivity at 300° C. (372° F.) is still lower than 1E11 ($1 \times 10^{11}$) Ohms·cm, preferably lower than 1E10 ($1 \times 10^{10}$) Ohms·cm, meaning that the powdery calcium-magnesium compound is robust and does not decompose at relatively high temperature. Accordingly, this powdery calcium-magnesium compound is able to positively modify the resistivity of air pollution control residue without impacting negatively the operation of the electrostatic precipitator.

If the powdery calcium-magnesium compound is a calcium-magnesium compound comprising at least a calcium-magnesium hydroxide content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it will be preferably injected at a location near upstream of the preheater as in that location of the flue gas flow inside which the calcium-magnesium compound is to be injected, the temperature is favorable for capture of pollutant compounds in the flue gas by the high hydroxide content. In this case, as the product does not decompose at typical temperatures upstream or near upstream of the air preheater, the resistivity of the calcium-magnesium compound after exposure at such typical temperatures, for example 370° C. (700° F.) is still low enough at typical temperatures of cold side ESP installations or hot side ESP installations to modify the resistivity of the mixture of the fly ashes present in the flue gas and the calcium-magnesium compound injected.

By the terms calcium-magnesium compound with a calcium-magnesium hydroxide content greater than or equal to 80 weight %, preferably greater than or equal to 82 weight %, more preferably greater than or equal to 85 weight %, advantageously greater or equal to 88 weight %, with respect to the total weight of the powdery calcium-magnesium compound, it is meant within the meaning of the present invention that at least one calcium-magnesium compound according to the present invention is therefore at least formed with (calcitic) slaked lime, slaked dolomitic lime (or dolime), magnesium slaked lime.

The molar proportion of calcium to magnesium in dolomitic lime (also called dolime) can vary from 0.8 to 1.2. In the calcium-magnesium compound, the proportion of calcium to magnesium can be also higher or lower up to 0.01 to 10 or even 100. Indeed, natural limestone which is calcined to form quicklime, which latter being further slaked to provide hydrated lime comprises magnesium carbonate at a level which can vary from 1 to 10 weight % with respect to the total weight of the powdery calcium-magnesium compound. If the compound in question is a magnesium carbonate which is calcined to form magnesium oxide, which latter being further slaked to provide magnesium hydroxide, its content in calcium carbonate can also vary from 1 to 10 weight %. It should be noted that a part of the magnesium oxide might remain unslaked.

The calcium-magnesium compound can also contain impurities. The impurities notably comprise all those which are encountered in natural limestones and dolomites, such as clays of the silico-aluminate type, silica, impurities based on common transition metal such as iron or manganese. The $CaCO_3$, $MgCO_3$, $Ca(OH)_2$ and $Mg(OH)_2$ contents in calcium-magnesium compounds may easily be determined with conventional methods. For example, they may be determined by X-ray fluorescence analysis, the procedure of which is described in the EN 15309 standard, coupled with a measurement of the loss on ignition and a measurement of the $CO_2$ volume according to the EN 459-2:2010 E standard.

Preferably, the calcium-magnesium compound according to the present invention presents a maximum resistivity $R_{max}$ lower than 5E11 ($5\times10^{11}$) Ohms·cm, preferably lower than 1E11 ($1\times10^{11}$) Ohms·cm and more preferably lower than 5E10 ($5\times10^{10}$) Ohms·cm.

Advantageously, the calcium-magnesium compound is doped with calcium nitrate an amount greater than or equal to 0.05 weight % and lower or equal to 5 weight % with respect to the total weight of the powdery calcium-magnesium compound.

In a preferred embodiment of the calcium-magnesium compound according to the present invention, the total weight of said calcium nitrate is greater than or equal to 0.1 weight % and lower than or equal to 5 weight %, preferably between 0.3 and 3 weight %, with respect to the total weight of the powdery calcium-magnesium compound.

In yet another preferred embodiment, the calcium-magnesium compound of the invention further comprises a sodium based additive in an amount up to 3.5 weight % with respect to the total weight of the powdery calcium-magnesium compound, expressed as sodium equivalent. Preferably, sodium is in a minimum amount of 0.2 wt. % with respect to the total weight of the powdery calcium-magnesium compound and expressed as sodium equivalent.

Sodium under the form of a sodium based additive in such amounts is known to have a slight effect on decreasing the resistivity of the sorbent, as presented by Foo et al. (2016) document previously mentioned. The applicant found that a sodium based additive in such amounts in combination with the presence as described hereunder of calcium nitrate further provides an additional effect on the decreasing of the resistivity of the sorbent composition. The use of a sodium based additive in combination with the presence as described hereunder of calcium nitrate decreases the resistivity of sorbent composition more than when presence as described hereunder of calcium nitrate is used alone in the calcium-magnesium compound and more than when a sodium based additive is used alone in the calcium-magnesium compound.

In a preferred embodiment, the powdery calcium-magnesium comprises particles having a $d_{50}$ comprised between 5 and 25 μm, preferably between 5 and 20 μm, more preferably between 5 and 16 μm.

The notation $d_X$ represents a diameter expressed in μm, as measured by laser granulometry in methanol optionally after sonication, relatively to which X % by mass of the measured particles are smaller or equal.

Preferably, in particular if the powdery calcium-magnesium compound is a calcium-magnesium compound comprising at least a calcium-magnesium hydroxide content greater than or equal to 80 weight %, the calcium-magnesium compound according to the invention has a BET specific surface area of at least 20 m²/g, preferably of at least 25 m²/g, preferably of at least 30 m²/g, more preferably of at least 35 m²/g. The BET surface area is determined by manometry with adsorption of nitrogen after degassing in vacuum at 190° C. (374° F.) for at least 2 hours and calculated according to the multipoint BET method as described in the ISO 9277/2010E standard.

Preferably, in particular if the powdery calcium-magnesium compound is a calcium-magnesium compound comprising at least a calcium-magnesium hydroxide content greater than or equal to 80 weight %, the sorbent composition according to the invention has a BJH pore volume of at least 0.1 cm³/g, preferably of at least 0.15 cm³/g, preferably of at least 0.17 cm³/g, more preferably of at least 0.2 cm³/g. The BJH pore volume is determined by manometry with desorption of nitrogen after degassing in vacuum at 190° C. (374° F.) for at least 2 hours and calculated according to the BJH method as described in the ISO 9277/2010E standard.

Other embodiments of the calcium-magnesium compound according to the present invention are mentioned in the appended claims According to a second aspect, the present invention also relates to a sorbent composition for flue gas treatment installation including an electrostatic precipitator comprising said calcium-magnesium compound according to the present invention.

Preferably, the sorbent composition according to the invention further comprises activated charcoal, lignite coke, halloysite, sepiolite, clays such as bentonite, kaolin, vermiculite or any other sorbent such as fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass.

In a preferred embodiment, the sorbent composition according to the present invention comprises a sodium based additive in an amount up to 3.5 weight % with respect to the total weight of the powdery calcium-magnesium compound and expressed as sodium equivalent. In particular, the amount of sodium in the composition would be higher than 0.2 weight % with respect to the total weight of the powdery sorbent composition.

In a preferred embodiment, the sorbent composition according to the present invention comprises said calcium nitrate at an amount greater than or equal to 0.05 weight % and lower or equal to 5 weight % with respect to the total weight of the powdery calcium-magnesium compound and wherein preferably the total weight of said calcium nitrate is greater than or equal to 0.1 weight % and lower than or equal to 5 weight %, preferably between 0.3 and 3 weight %, with respect to the total weight of the dry sorbent composition.

In a preferred embodiment of the sorbent composition according to the invention, the said calcium-magnesium compound is hydrated lime.

Other embodiments of the sorbent composition according to the present invention are mentioned in the appended claims According to a third aspect, the present invention is related to a process for manufacturing a sorbent composition for a flue gas treatment installation including an electrostatic precipitator, the process comprising the steps of:
  a) providing a calcium-magnesium compound to a reactor;
  b) adding calcium nitrate or nitric acid or a combination thereof in an amount calculated to obtain between 0.1 weight % and 5 weight %, preferably between 0.3 weight % to 3 weight % of calcium nitrate in weight of dry sorbent composition.

In a preferred embodiment, the sorbent composition comprises particles having a $d_{50}$ comprised between 5 and 25 µm, preferably between 5 and 20 µm, more preferably between 5 and 16 µm.

In another preferred embodiment of the process according to the present invention, said calcium-magnesium compound comprises a calcium-magnesium hydroxide content greater or equal to 80 weight %, with respect to the total weight of the dry calcium-magnesium compound.

Preferably the process of manufacturing said sorbent composition comprises a step of adding a sodium based additive in an amount calculated to obtain up to 3.5% of sodium equivalent in weight of the dry sorbent composition.

In an embodiment of the process of manufacturing according to the invention, the step of providing a calcium-magnesium compound to a reactor comprises the step of providing a quicklime to said reactor, slaking said quicklime with a predetermined amount of water to obtain said calcium-magnesium compound comprising at least a calcium hydroxide content greater or equal to 80 weight %, with respect to the total weight of the dry calcium-magnesium compound with an predetermined amount of moisture.

More advantageously, said step of slaking is performed in conditions such as to obtain hydrated lime with a BET specific surface area by nitrogen adsorption of at least 20 m²/g, preferably of at least 25 m²/g, preferably of at least 30 m²/g, more preferably of at least 35 m²/g.

In further preferred embodiment, said step of slaking is performed in conditions such as to obtain hydrated lime with a BJH pore volume for pores having a diameter lower or equal to 1000 Å by nitrogen desorption of at least 0.1 cm³/g, 0.15 cm³/g, preferably of at least 0.17 cm³/g, more preferably of at least 0.2 cm³/g.

Preferably, said step of slaking is performed in the same conditions as the ones described in U.S. Pat. No. 6,322,769 of the applicant and incorporated by reference.

In an alternative embodiment of the process of manufacturing according to the invention, the said step of slaking is performed in the same conditions as the ones described in the U.S. Pat. No. 7,744,678 of the applicant and incorporated by reference.

In an embodiment of the process of manufacturing said sorbent according to the invention, the step of adding an additive or a mixture of additives, comprising at least calcium nitrate or nitric acid or a combination thereof is performed before said step of slaking quicklime.

In another embodiment of the process of manufacturing said sorbent composition, the said step of adding an additive or a mixture of additives, comprising at least calcium nitrate or nitric acid or a combination thereof is performed during said step of slaking quicklime.

Alternatively, in the process of manufacturing said sorbent composition, the said step of adding an additive or a mixture of additives, comprising at least calcium nitrate or nitric acid or a combination thereof is performed after the said step of slaking quicklime.

It has been found by the applicant that the step of adding an additive or a mixture of additives, comprising at least calcium nitrate or nitric acid or a combination thereof performed before, during or after the said step of slaking, in the amounts mentioned hereinabove, does not substantially change the pore volume of the calcium-magnesium compound. Also, the specific surface area in any case remains above 20 m²/g. In particular, the specific surface area of the sorbent composition according to the present invention is substantially the same as for calcium hydroxide sorbent prepared by the known methods such as the one described in U.S. Pat. Nos. 6,322,769 and 7,744,678 incorporated by reference, provided that addition of calcium nitrate or nitric acid or a combination thereof is performed after the step of slaking and preferably before the step of drying. Therefore, the properties of the sorbent ensuring the efficiency of $SO_2$ removal are preserved.

Preferably, the said process of manufacturing is characterized in that it further comprises a step of adding activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass, preferably performed after the said step of slaking.

Other embodiments of the process for manufacturing a sorbent composition according to the present invention are mentioned in the appended claims In a fourth aspect, the present invention is related to a flue gas treatment process using an installation comprising an injection zone arranged upstream of an electrostatic precipitator, characterized in that it comprises a step of injecting in said injection zone a sorbent composition as disclosed herein according to the present invention.

More particularly, the flue gas treatment process using an installation including an electrostatic precipitator, and an injection zone arranged upstream of said electrostatic precipitator and through which flue gas is flowing towards said electrostatic precipitator is characterized in that the said process comprises a step of injection of a sorbent composition in said injection zone, said sorbent composition comprising a calcium-magnesium sorbent, calcium nitrate, the total amount of said calcium nitrate being comprised between 0.1% and 5%, preferably 0.3 to 3.5% in weight of the dry composition.

According to the present invention, the said sorbent composition has a lower resistivity compared to calcium-magnesium sorbents of prior art, for example at 200° C. or lower after exposure to a temperature of 300° C. (572° F.). Injection of the sorbent composition according to the invention in an injection zone to mix with flue gas is effective for the removal of $SO_2$ and other gaseous acids and the lower resistivity of such sorbent composition improves the collection of particulate matter on the collecting electrodes of the electrostatic precipitator.

In another preferred embodiment of the process according to the present invention, the sorbent composition comprises a calcium-magnesium compound at least a calcium-magnesium hydroxide, and said sorbent composition is injected in said injection zone wherein said flue gas has a temperature greater than or equal to 180° C. (356° F.), preferably greater than 200° C. (392° F.), more preferably comprised between 300° C. (572° F.) and 425° C. (797° F.).

The said sorbent composition can be used in the flue gas treatment process according to the present invention under a broad range of temperatures, for example between 100° C. (212° F.) and 425° C. (797° F.).

Advantageously, the said additives of the sorbent composition according to the present invention do not encounter degradation at temperatures higher than 180° C. (356° F.) so that said sorbent composition can be injected in the said injection zone wherein the temperature is greater than or equal to 180° C. (356° F.), preferably greater than or equal to 300° C. (572° F.). As the injection zone is located upstream of the air preheater, temperatures at the injection zone can range between 300° C. (372° F.) to 425° C. (797° F.), preferably 350° C. (662° F.) to 380° C. (716° F.).

Preferably, in the flue gas treatment process according to the invention, the said injection zone is located upstream of an air preheater itself located upstream of said electrostatic precipitator.

Preferably, in the flue gas treatment process of the invention, the said sorbent composition comprises a sodium based additive in an amount up to 3.5% in weight of the dry composition and expressed as sodium equivalent.

Preferably, in the flue gas treatment process of the invention, the said sorbent composition has a BET specific surface area of at least 20 m$^2$/g.

Preferably, in the flue gas treatment process of the invention, the said sorbent composition has a BJH pore volume obtained from nitrogen desorption of at least 0.1 cm$^3$/g.

Preferably, in the flue gas treatment process of the invention, the said sorbent composition has a BJH pore volume obtained from nitrogen desorption of at least 0.15 cm$^3$/g, preferably of at least 0.17 cm$^3$/g, more preferably of at least 0.2 cm$^3$/g.

Preferably, in the flue gas treatment process of the invention, the said sorbent composition further comprises activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, or water glass.

In an embodiment of the flue gas treatment process of the invention, the said sorbent composition is injected as a dry powder in a dry injection system or as an atomized slurry in a spray dryer absorber.

Other embodiments of the flue gas treatment process according to the present invention are mentioned in the appended claims.

In a fifth aspect, the present invention is related to a flue gas treatment device comprising an electrostatic precipitator downstream of an air preheater, said air preheater being connected to said electrostatic precipitator by a duct, characterized in that it further comprises an injection zone for injecting a sorbent composition according to the present invention arranged upstream of said air preheater.

Other embodiments of the flue gas treatment device according to the present invention are mentioned in the appended claims.

Preferably the said flue gas treatment device or installation is used for treating flue gas of a plant, in particular a power plant, using coal or fuel containing sulfur species or other acid gas precursors.

Preferably the said flue gas treatment installation further comprises a reservoir comprising said sorbent composition to provide said sorbent composition to the said injection zone through a sorbent inlet.

DETAILED DESCRIPTION OF THE INVENTION

According to a first aspect, the present invention is related to a sorbent composition for flue gas treatment installation including an electrostatic precipitator, said sorbent composition comprising calcium-magnesium compound, characterized in that it further comprises an additive or a mixture of additives in an amount comprised between 0.1% and 5%, preferably 0.3% to 3% in weight of the dry composition, said additive or additives containing at least calcium nitrate.

In a preferred embodiment, the calcium-magnesium compound is based on hydrated lime.

Calcium hydroxide sorbents are manufactured by reacting (or slaking) calcium oxide, CaO or quick lime, with water in a so called hydrator, also called slaking unit. Alternatively, calcium magnesium hydroxide sorbents are manufactured by reacting dolomitic lime (also called dolime) or magnesium lime with water in a hydrator. Alternatively, quick lime and dolomitic lime can be mixed together and slaked with water in a hydrator to provide a mixture of calcium hydroxide and calcium magnesium hydroxide. In the following, the process of manufacturing of the sorbent composition will refer to quick lime but the process of manufacturing is not limited to quick lime as a starting material and dolomitic lime or a combination of dolomitic lime and/or magnesium lime and quick lime can also be used as starting materials.

The process of manufacturing of the said sorbent composition according to the invention comprises a step of slaking quicklime with a predetermined amount of water to obtain hydrated lime with an predetermined amount of moisture, and is characterized in that it comprises a step of adding an additive or a mixture of additives to dope the sorbent composition in an amount calculated to obtain between 0.1% and 5%, preferably between 0.3 and 3.5% of said additive or mixture of additives in weight of the dry sorbent composition, said additive or additives containing at least calcium nitrate or nitric acid or a combination thereof.

In an embodiment of the process of manufacturing the said sorbent composition, the predetermined amount of water in the said step of slaking is in a water to lime ratio 2:1 by weight or higher.

In an embodiment of the process of manufacturing the said sorbent composition, the amount of water in the slaking step can be adapted to obtain a hydrated lime with a moisture less than or equal to 10 wt %, preferably less than or equal to 5 wt. %, preferably less than or equal to 2 w %, more preferably less than or equal to 1 w % with respect to the total weight of the sorbent composition at a powdery state.

In another embodiment, the amount of water in the slaking step can be adapted to obtain a hydrated lime with a moisture content comprised between 5 wt. % and 20 wt. %. The amount of water in the slaking step can also be higher such as to obtain a hydrated lime with a moisture content above 20 wt. %, all % being expressed with respect to the total weight of the sorbent composition at a powdery state.

In an embodiment, the hydrated lime obtained after the slaking step is dried in a further step.

In an embodiment of the process of manufacturing of the sorbent composition according to the invention, the said additive containing calcium nitrate is used to dope the sorbent composition by adding the additive containing calcium nitrate as an aqueous solution or as a suspension or as a powder before or during the said step of slaking of calcium oxide or calcium magnesium oxide or a combination thereof.

In another embodiment of the process of manufacturing of the sorbent composition according to the invention, calcium nitrate is added as aqueous solution or as a suspension or as a powder after the said step of slaking. Preferably, a step of drying is performed after the step of slaking and after the step of adding calcium nitrate. Calcium nitrate is preferably added to calcium hydroxide or calcium magnesium hydroxide before injection in an injection zone of the flue gas treatment installation.

In a preferred embodiment of the process of manufacturing of the sorbent composition, the said step of slaking quicklime is performed in the conditions such as to obtain hydrated lime with a BET specific surface area from nitrogen adsorption of at least 20 m$^2$/g and a BJH pore volume obtained from nitrogen desorption of at least 0.1 cm$^3$/g. Various processes are available to the man skilled in the art to obtain an hydrated lime with such properties, and are disclosed for example in documents U.S. Pat. Nos. 6,322,769 and 7,744,678 of the applicant and incorporated by reference.

In the process of manufacturing the sorbent composition according to the invention, particles of quicklime are advantageously used having a particle size distribution of less than 5 mm, in particular quicklime particles of particle size distribution 0-2 mm.

Other processes for obtaining hydrated lime with high specific area and/or high pore volume can be found for example in U.S. Pat. No. 5,492,685 wherein an amount of alcohol such methanol or ethanol is added prior and/or the step of slaking quicklime and is removed after drying, in patent DE3620024 wherein sugar is added in the step of slaking for increasing the specific surface area and wherein glycols or amines are added to increase the flowability, in U.S. Pat. Nos. 5,277,837 and 5,705,141 wherein additives such as ethylene glycol, diethylene glycol, tri ethylene glycol, monoethanolamine, diethanolamine, triethanolamine or a combination thereof is added in the step of slaking for increasing the surface area of hydrated lime.

In the process of manufacturing the sorbent composition, calcium nitrate can be added in certain amounts according to the invention as disclosed herein before the said step of slaking, during the step of slaking or after the step of slaking without substantially changing the BJH pore volume for pores having a diameter lower than or equal to 1000 Å of the sorbent composition. Moreover the BJH pore volume of the sorbent composition according to the present invention is substantially the same as for calcium hydroxide sorbent prepared by the known methods such as the one described in U.S. Pat. Nos. 6,322,769 and 7,744,678 incorporated by reference. Also, the BET specific surface area of the sorbent composition is above 20 m$^2$/g. Therefore, the properties of the sorbent ensuring the efficiency of SO$_2$ removal are preserved. Alternatively, nitric acid or calcium nitrate and nitric acid can be added before, during or after the step of slaking. Preferably, a higher BET specific surface area is obtained when calcium nitrate or nitric acid or a combination thereof is added after the step of slaking, and preferably before a drying step.

In the said process of manufacturing the sorbent composition according to the invention, if a hydrated lime composition is prepared according to the method described in U.S. Pat. No. 7,744,678, such method comprises a step of adding a quantity of an alkali metal, preferably sodium in an quantity to the quicklime or to the slaking water or to the hydrated lime, sufficient to obtain in the hydrated lime an alkali metal content that is equal to or greater than 0.2% and equal or less than 3.5% by weight based on the total weight of the dry sorbent composition. The sodium can be added, for example, as Na$_2$CO$_3$. According to this embodiment, calcium nitrate or nitric acid or a combination thereof is further added after the step of slaking, and preferably before a drying step with an amount such as to obtain a content in calcium nitrate between 0.1% and 5%, preferably 0.3% to 3% in weight of the dry sorbent composition.

Various sorbent compositions have been prepared according to the method of the present invention and measurements of the resistivity of dry powders of said sorbent compositions have been carried out in following the procedure outlined by IEEE (Estcourt, 1984). Basically, a resistivity cell of a determined volume is filled by a dry powder of sorbent composition and the powder is then compacted with a weight such as to obtain a flat surface. An electrode with a guard is placed over the surface of the powder and the resistivity of the powder is measured in an oven under a stream of air comprising 10% of humidity at various temperatures comprised between 150° C. (302° F.) and 300° C. (372° F.). The resistivity of comparatives examples have been measured in the same conditions. For each measurement, a maximum resistivity Rmax and a resistivity at 300° C. (572° F.) has been determined. The resistivity measurements are presented herein after:

Example set A

Example 1 is a comparative sample of calcium hydroxide sorbent designed for the removal of acid gas pollutants manufactured according to U.S. Pat. No. 6,322,769 B1. This sample was obtained from an industrial installation. No sodium based additive nor calcium nitrate nor nitric acid has been added.

Example 2 is a comparative sample of a calcium hydroxide sorbent designed for the removal of acid gas pollutants manufactured according to U.S. Pat. No. 7,744,678 B2. This sample has a content of Ca(OH)$_2$>90 w %, CaCO$_3$<8 w %, and of Na$_2$CO$_3$ of about 0.8 w % and the rest of impurities. No further sodium based additive or calcium nitrate or nitric acid has been added. This sample was obtained from an industrial installation.

Example 3 is another sample of a calcium hydroxide sorbent designed for the removal of acid gas pollutants manufactured according to U.S. Pat. No. 7,744,678 B2 and wherein the lime comes from another source. This sample has a content of Ca(OH)$_2$>90 w %, of CaCO$_3$<7 w %, and 2.1 w % of Na$_2$CO$_3$ and the rest of impurities. No further sodium based additive or calcium nitrate nor nitric acid has been added. This sample was obtained from an industrial installation.

Example 4 is a calcium hydroxide sorbent manufactured according to the present invention using same source of lime as for the example 3 and using calcium nitrate as dopant in an amount of 1% relative to the dry product. This sample was obtained from an industrial installation.

Example 5 is a calcium hydroxide sorbent manufactured according to the present invention using same source of lime as for the example 3 and using calcium nitrate as dopant in an amount of 2% relative to the dry product. This sample was obtained from an industrial installation.

Example 6 is a calcium hydroxide sorbent manufactured according to the present invention, at laboratory scale by mixing (slaking), in a mixer with paddles, quicklime with stoichiometric amount of water and a quantity of Na$_2$CO$_3$ such as to obtain a sodium content of 2% by weight based on the total weight of the dried powdered composition obtained. The quicklime was obtained by calcination of lime from the same source of lime as for the example 3. After reaction in the mixer, the hydrated lime (calcium hydroxide) was discharged, dried and submitted to post treatment with 1% of HNO$_3$ by weight of the dry product.

Table 1 shows the measured resistivity parameters $R_{max}$ and $R_{300}$ for those examples. All the measurements of resistivity parameters have been performed by measuring the resistivity of samples under increasing temperatures.

TABLE 1

Resistivity parameters of calcium hydroxide sorbents of examples 1 to 6.

| Example | $R_{max}$ (Ω · cm) | $R_{300}$ (Ω · cm) |
|---------|--------------------|--------------------|
| Ex. 1   | 8E12               | 3E12               |
| Ex. 2   | 4E11               | 1E11               |
| Ex. 3   | 9E10               | 4E09               |
| Ex. 4   | 9E09               | 1E08               |
| Ex. 5   | 6E09               | 4E07               |
| Ex. 6   | 4E10               | 1E08               |

From Table 1, it is clear that the both the $R_{max}$ value and the R300 value of Example 1 are high at and above the preferred range of resistivity values comprised between 10E7 ohms·cm and 2E10 ohms·cm. The presence of 0.8 wt. % of $Na_2CO_3$ in the sorbent composition of the Example 2 reduces the $R_{max}$ and $R_{300}$ values by more than one order of magnitude respect to the $R_{max}$ and $R_{300}$ values of the composition of example 1. The presence of 2.1 w % of $Na_2CO_3$ in the sorbent composition of example 3 reduces the $R_{max}$ and $R_{300}$ values by more than two orders of magnitude respect to the $R_{max}$ and $R_{300}$ values of the composition of example 1. Surprisingly the presence of a small amount of calcium nitrate in an amount of 1 wt % in the composition of example 4 reduces the $R_{max}$ value by nearly three order of magnitude and the $R_{300}$ value by nearly four orders of magnitude respect to the $R_{max}$ and $R_{300}$ values of the composition of example 1. The presence of 2 w % of calcium nitrate in the composition of example 5 decreases even more the values of $R_{max}$ and $R_{300}$ relative to the composition of example 1. Therefore, surprisingly the addition of calcium nitrate or nitric acid is more effective for lowering the resistivity than the addition of a sodium based additive. Despite some differences due to the different process conditions (industrial scale and laboratory scale), the presence of calcium nitrate in the composition of example 6 by addition of $HNO_3$ instead of by addition of calcium nitrate has the same tendency of the lowering the resistivity of the sorbent as the addition of $Ca(NO_3)_2$.

Examples set B

Example 7 is a sample of fly ash obtained from a coal power station.

Example 8 is a blend of 80 w % of fly ash of example 7 with 20 w % of a sorbent according to example 3.

Example 9 is a blend of 80 w % of fly ash of example 7 with 20 w % of a sorbent according to example 4.

Example 10 is a blend of 80 w % of fly ash of example 7 with 20 w % of a sorbent according to example 5.

Table 2 shows the measurement of resistivity parameters of Rmax and R300 for those examples 7 to 10. One set of measurements of Rmax and R300 has been performed by measuring the resistivity of the samples under increasing temperatures and one set of measurements of Rmax has been performed by measuring the resistivity of the samples under decreasing temperatures.

TABLE 2

|            | Rmax under increasing temperature (Ω · cm) | R300 under increasing temperature (Ω · cm) | Rmax under decreasing temperature (Ω · cm) |
|------------|--------------------------------------------|--------------------------------------------|--------------------------------------------|
| Example 7  | 3E10                                       | 5E09                                       | 3E10                                       |
| Example 8  | 2E12                                       | 3E10                                       | 1E12                                       |
| Example 9  | 1E11                                       | 1E09                                       | 2E10                                       |
| Example 10 | 4E10                                       | 7E07                                       | 2E09                                       |

The results presented in table 2 shows that for the same proportions of fly ash and calcium based sorbent, the blend of fly ash with a calcium based sorbent without calcium nitrate additive presents higher resistivity parameters Rmax and R300 than fly ash without calcium based sorbent, whereas the presence of only 1 w %, preferably 2 w % of $CaNO_3$ additive in the calcium based sorbent has an positive influence on the resistivity parameters $R_{max}$ and R300 of the blend.

It is to be mentioned that the examples of sorbent compositions presented herein above are not limitative for the present invention, and other additives in the amounts comprised between 0.1 and 5% in weight of the dry sorbent composition can be used to decrease the resistivity of sorbent compositions destined to be used in flue gas treatment processes using an electrostatic precipitator.

It is to be mentioned that improvements of particulate matter collection on collecting electrodes of an electrostatic precipitators can be observed with the use of the sorbent according to the present invention.

Figure 1:
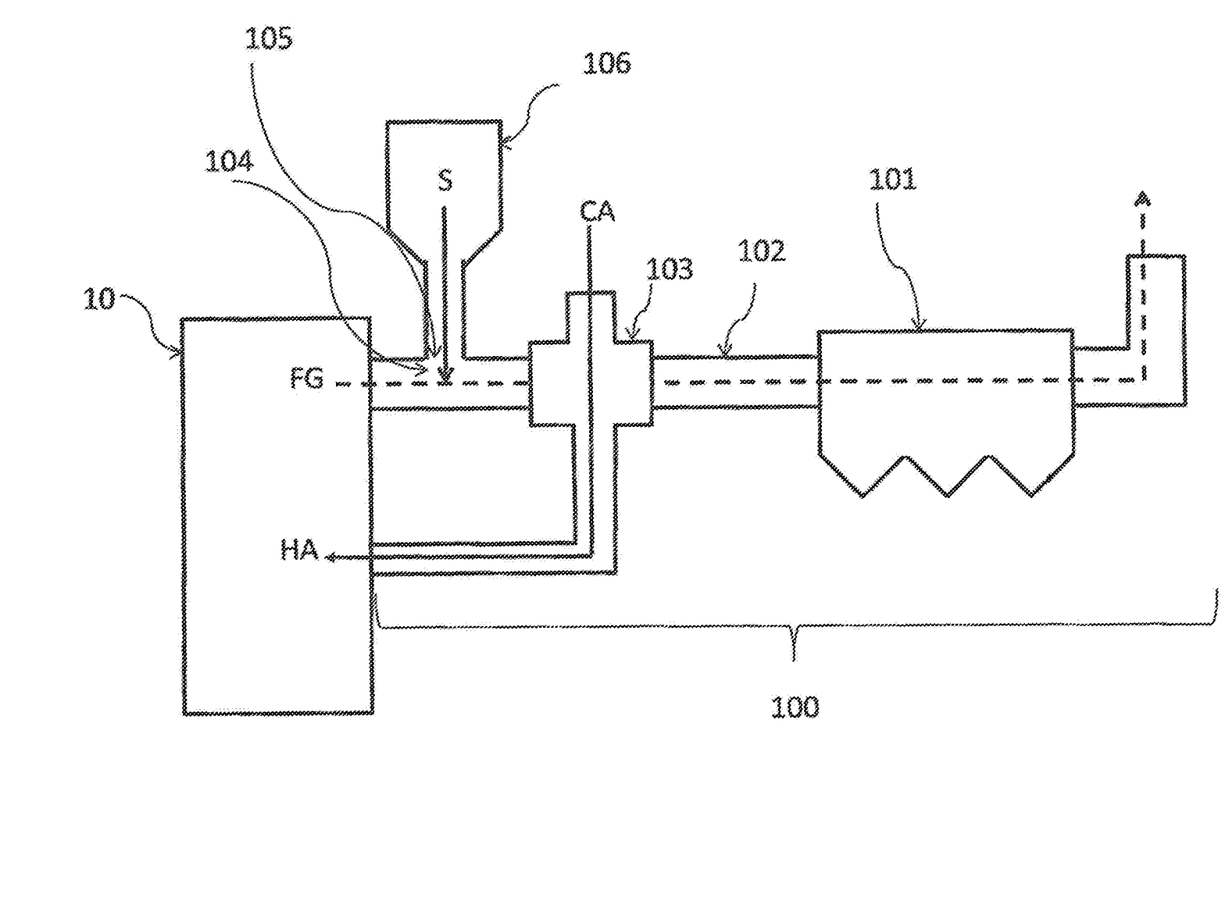
FIG. 1 presents a schematic embodiment of a flue gas treatment installation carrying out the flue gas treatment process with the sorbent composition according to the present invention.

According to another aspect, the present invention is related to a flue gas treatment installation. FIG. 1 shows a schematic embodiment of a flue gas treatment installation 100 comprising an electrostatic precipitator 101 arranged downstream a first duct portion 102 arranged downstream an air preheater 103, characterized in that an injection zone 104 is arranged upstream said air preheater 103 and comprises a sorbent inlet 105. The said flue gas treatment installation 100 further comprises a reservoir 106 comprising said sorbent composition S to provide said sorbent composition to the said injection zone through the said sorbent inlet. The hot flue gas FG produced by a boiler 10 is flown through the injection zone wherein the sorbent S according to the invention is injected to react with $SO_2$ and other acidic gases from the flue gas, then the hot flue gas crosses the air preheater through which cold air CA is flown to absorb the heat of the hot flue gas and to be injected as hot air HA in the boiler. Then the flue gas flows through the electrostatic precipitator 101 wherein charged collecting electrodes collects the particulate matter including the sorbent composition according to the invention that has reacted with undesired acidic gases. The flue gas treatment installation described herein is relatively simple and is well adapted for the use of the sorbent composition according to the present invention.

Preferably the said flue gas treatment installation is used for treating flue gas of a power plant using coal or fuel containing sulfur species or other acid gas precursors.

It should be understood that the present invention is not limited to the described embodiments and that variations can be applied without going outside of the scope of the appended claims.

For example, in the preferred embodiment, the installation for flue gas treatment was described with an electrostatic precipitator downstream of an air preheater, said air preheater being connected to said electrostatic precipitator by a duct with an injection zone for injecting a sorbent composition according to the present invention arranged upstream of said air preheater. An alternative within the scope of the present may comprises a particulate collection device upstream of said preheater.

Another alternative of the flue gas treatment device according to the present invention comprises in sequence an electrostatic precipitator, a preheater followed by optionally a particulate collection device, before reaching the chimney.

The particulate collection device can be another electrostatic precipitator or any kind of filter, such as a bag house filter.

In all of those embodiments, the sorbent composition according to the present invention is injected in an injection zone located upstream of said electrostatic precipitator, before or after the preheater, depending on the on-site configuration.

What is claimed is:

1. A powdery calcium-magnesium compound comprising at least a calcium-magnesium hydroxide content greater or equal to 80 weight %, with respect to the total weight of the powdery calcium-magnesium compound characterized in that it presents a resistivity at 300° C. (572° F.) (R300) lower than $1E11 (1\times10^{11})$ Ohms·cm and higher than $1E7 (1\times10^{7})$ Ohms·cm; and
wherein the powdery calcium-magnesium compound is doped with calcium nitrate at an amount greater than or equal to 0.05 weight % and lower or equal to 5 weight % with respect to the total weight of the powdery calcium-magnesium compound.

2. A powdery calcium-magnesium compound, according to claim 1, further comprising a sodium based additive in an amount up to 3.5 weight % with respect to the total weight of the powdery calcium-magnesium compound, expressed as sodium equivalent.

3. A powdery calcium-magnesium compound according to claim 1, presenting a BET specific surface area by nitrogen adsorption of at least 20 $m^2/g$.

4. A powdery calcium-magnesium compound according to claim 1, presenting a BJH pore volume for pores having a diameter lower or equal to 1000 Å by nitrogen desorption of at least 0.1 $cm^3/g$.

5. A sorbent composition for a flue gas treatment installation including an electrostatic precipitator, the sorbent composition comprising a powdery calcium-magnesium compound having at least a calcium-magnesium hydroxide content greater or equal to 80 weight %, with respect to the total weight of the powdery calcium-magnesium compound characterized in that it presents a resistivity at 300° C. (572° F.) (R300) lower than $1E11 (1\times10^{11})$ Ohms·cm and higher than $1E7 (1\times10^{7})$ Ohms·cm;
wherein said powdery calcium-magnesium compound is doped with calcium nitrate and wherein said calcium nitrate is present at an amount greater than or equal to 0.05 weight % and lower or equal to 5 weight % with respect to the total weight of the powdery calcium-magnesium compound.

6. A sorbent composition according to claim 5 further comprising an additive selected from the group consisting of activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, organic sulphide, calcium sulfate, open-hearth coke, lignite dust, fly ash, and water glass.

7. A sorbent composition according to claim 5, comprising a sodium based additive in an amount up to 3.5 weight % with respect to the total weight of the powdery sorbent composition and expressed as sodium equivalent.

8. A sorbent composition according to claim 5, wherein said calcium-magnesium compound is hydrated lime.

9. A process for manufacturing a sorbent composition for a flue gas treatment installation including an electrostatic precipitator, the process comprising the steps of
a) providing a powdery calcium-magnesium compound to a reactor, the powdery calcium-magnesium compound comprising at least a calcium-magnesium hydroxide content greater or equal to 80 weight %, with respect to the total weight of the powdery calcium-magnesium compound characterized in that it presents a resistivity at 300° C. (572° F.) (R300) lower than $1E11 (1\times10^{11})$ Ohms·cm and higher than $1E7 (1\times10^{7})$ Ohms·cm; and
b) adding an additive selected from the group consisting of calcium nitrate and nitric acid and combinations thereof in an amount calculated to obtain between 0.1 weight % and 5 weight % of calcium nitrate in weight of dry sorbent composition.

10. A process according to claim 9, wherein said calcium-magnesium compound comprises a calcium-magnesium hydroxide content greater or equal to 80 weight %, with respect to the total weight of the dry calcium-magnesium compound.

11. A process according to claim 9, wherein said step of providing a calcium-magnesium compound to a reactor comprises a step of providing a quicklime to said reactor, slaking said quicklime with a predetermined amount of water to obtain said calcium-magnesium compound comprising at least a calcium hydroxide content greater or equal to 80 weight %, with respect to the total weight of the dry calcium-magnesium compound with a predetermined amount of moisture.

12. A process for manufacturing a sorbent composition according to claim 9, characterized in that it comprises a step of adding a sodium based additive in an amount calculated to obtain up to 3.5% of sodium equivalent in weight of the dry sorbent composition.

13. A process for manufacturing a sorbent composition according to claim 11, characterized in that said step of slaking is performed in conditions such as to obtain hydrated lime with a BET specific surface area measured by nitrogen adsorption of at least 20 $m^2/g$.

14. A process for manufacturing a sorbent composition according to claim 11 characterized in that said step of slaking is performed in conditions such as to obtain hydrated lime with a BJH pore volume for pores having a diameter lower or equal to 1000 Å measured by nitrogen desorption of at least 0.1 $cm^3/g$.

15. A process for manufacturing a sorbent composition according to claim 9, characterized in that it further comprises a step of adding an additional additive selected from the group consisting of activated charcoal, lignite coke, halloysite, sepiolite, clays, bentonite, kaolin, vermiculite, fire clay, aerated cement dust, perlite, expanded clay, lime sandstone dust, trass dust, Yali rock dust, trass lime, fuller's earth, cement, calcium aluminate, sodium aluminate, calcium sulphide, an organic sulphide, calcium sulfate, open-hearth coke, lignite dust, fly ash, and water glass.

16. A flue gas treatment process using an installation comprising an injection zone arranged upstream of an electrostatic precipitator, characterized in that it comprises a step of injecting in said injection zone a sorbent composition comprising a powdery calcium-magnesium compound having, at least a calcium-magnesium hydroxide content greater or equal to 80 weight %, with respect to the total weight of the powdery calcium-magnesium compound characterized in that it presents a resistivity at 300° C. (572° F.) (R300) lower than 1E11($1\times10^{11}$) Ohms·cm and higher than 1E7($1\times10^{7}$) Ohms·cm and wherein said powdery calcium-magnesium compound is doped with calcium nitrate, said calcium nitrate being present at an amount greater than or equal to 0.05 weight % and lower or equal to 5 weight % with respect to the total weight of the powdery calcium-magnesium compound.

17. A flue gas treatment process according to claim 16, wherein said sorbent composition is injected in said injection zone wherein said flue gas has a temperature greater than or equal to 180° C. (356° F.).

18. A flue gas treatment process according to claim 16, wherein said sorbent composition is injected as a dry powder in a dry sorbent injection system or injected as an atomized slurry in a spray dryer absorber system.

\* \* \* \* \*